United States Patent [19]

Tsukamoto

[11] Patent Number: 4,759,395
[45] Date of Patent: Jul. 26, 1988

[54] BEAD BREAKER FOR VEHICLE TIRES

[76] Inventor: Kazuichi Tsukamoto, 63-38 Kitashinden, Ogawa machi, Shimomashiki, Kumamoto, Japan, 869-06

[21] Appl. No.: 54,757

[22] Filed: May 27, 1987

[30] Foreign Application Priority Data

Jun. 5, 1986 [JP] Japan .............................. 61-131328
Mar. 20, 1987 [JP] Japan .............................. 62-66984

[51] Int. Cl.$^4$ ............................................. B60C 25/06
[52] U.S. Cl. ...................................... 157/1.2; 157/1.1
[58] Field of Search ................. 157/1.17, 1.26, 1.28, 157/1.1, 1.3, 1.2, 1.0; 59/79.1, 79.2; 267/74

[56] References Cited

U.S. PATENT DOCUMENTS

| 1,489,736 | 4/1924 | Brundage | 267/74 X |
| 2,566,315 | 9/1951 | Christofoli et al. | 157/1.2 |
| 2,580,926 | 1/1952 | Johnson et al. | 157/1.2 |
| 2,893,478 | 7/1959 | Crawford | 157/1.2 |
| 4,489,548 | 12/1984 | Derman | 267/74 X |

FOREIGN PATENT DOCUMENTS 1082318 12/1954 France .................................. 157/1.2

Primary Examiner—Debra Meislin
Attorney, Agent, or Firm—John F. Ingman

[57] ABSTRACT

The bead breaker for vehicle tires involves a hydraulic jack member whose base is attached to a bead pressing member and whose extendable head is connected by tension members, such as a chain and hook combination, to the wheel. The bead pressing member may have alternative configurations, one being an adjustable split presser assembly comprising a presser arm, attached to the jack base, upon whose opposing extended arms are slidingly mounted adjustable sleeves. Attached to each radially adjustable sleeve is an arcuate presser section which presses downward against the tire bead when the jack head is extended, breaking the bead. In the alternative bead pressing member, the presser arm, attached to the jack base, is removably attached to a ring presser member, which presses against the tire bead along a full 360-degree circumference. A larger bead pressing ring is concentrically attached to a smaller ring, so as to allow the ring presser member to be readily reversed for application to either a larger or a smaller wheel. Springs may be used between the jack base and the extendable jack head to retract the jack head upon release of hydraulic pressure. A chain retractor, in the form of a rubber sleeve or a coil spring, may assist in retaining hook-wheel connections.

7 Claims, 4 Drawing Sheets

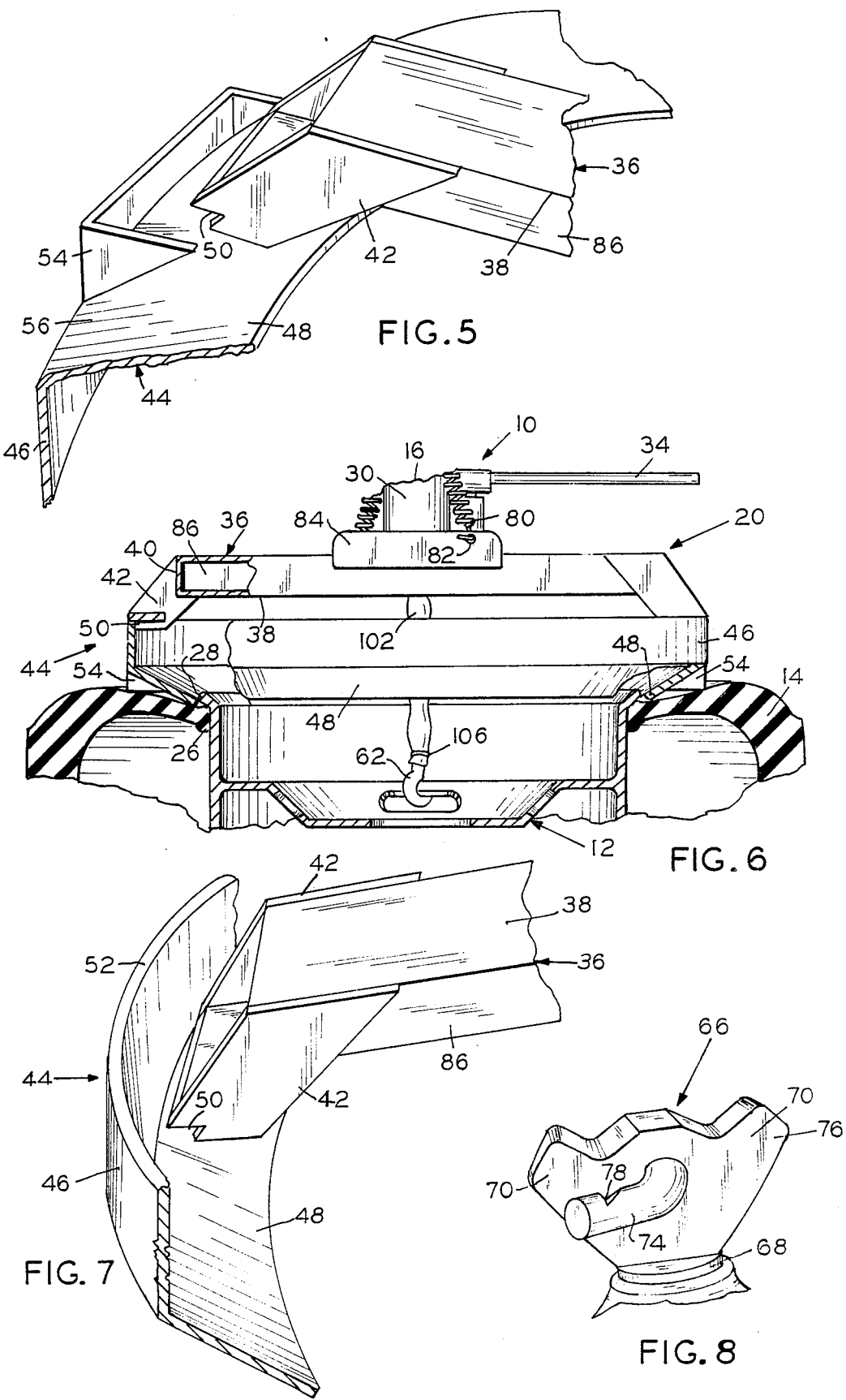

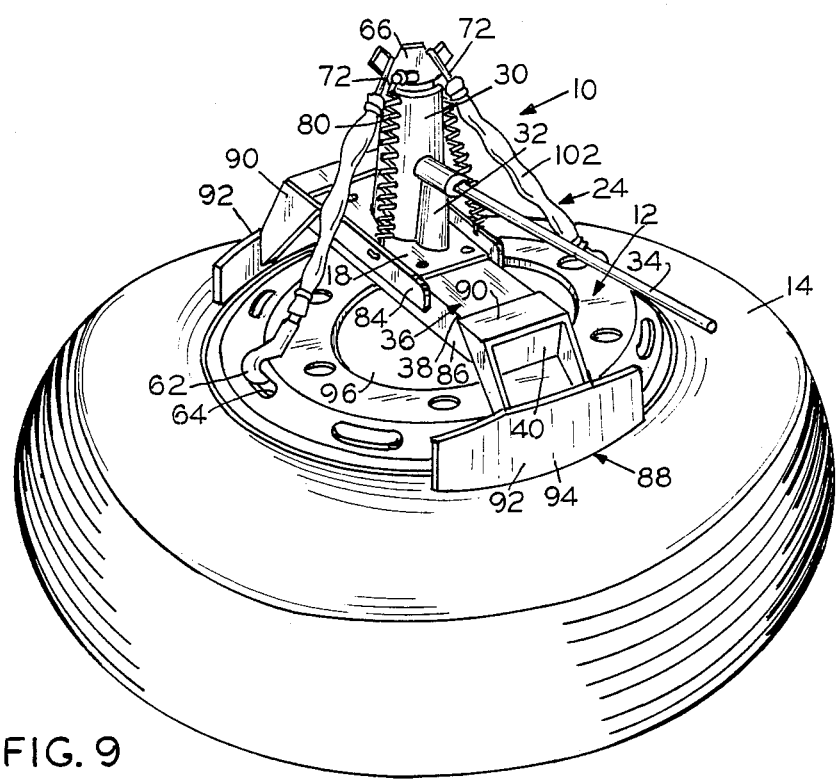
FIG. 9
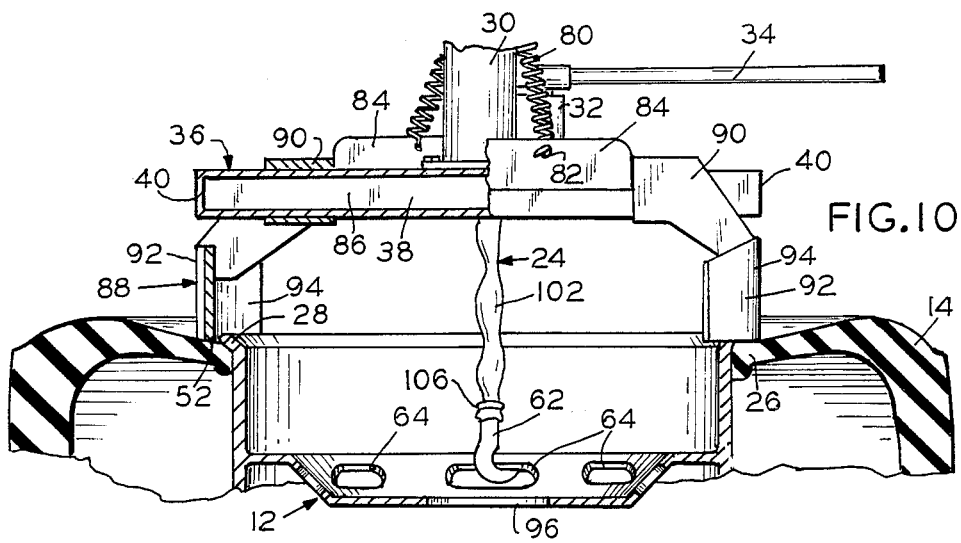
FIG. 10
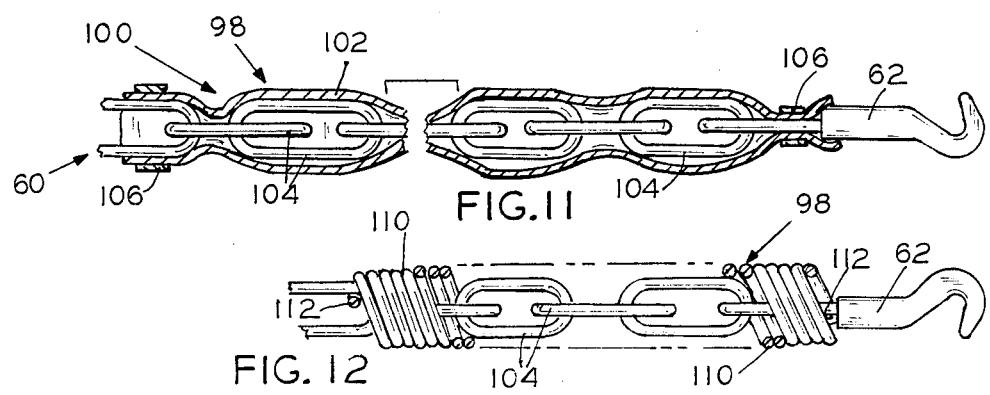
FIG. 11
FIG. 12

BEAD BREAKER FOR VEHICLE TIRES

BACKGROUND OF THE INVENTION

1. Field of the Invention

The present invention generally relates to bead breakers for vehicle tires, and, more particularly is concerned with a portable bead breaker for truck or bus tires which utilizes a hydraulic jack mechanism.

2. Description of the Prior Art

In replacing tires or fixing flat tires, it is necessary to separate the bead of the tire from the rim of the wheel. It has been common practice, in manual removal, to insert a lever between the tire bead and the wheel rim, and to pry the tire bead loose; or alternatively, to insert a piece of metal between the bead and the rim and strike the metal with a hammer. However, especially on larger vehicles, such as trucks and buses, the bead may be so tightly bound to the rim that such manual separation is time consuming, laborious, and sometimes dangerous.

Various bead breaking machines, using air or hydraulic power, have been developed and are used for larger tires. However, these machines are generally heavy, stationary and expensive, and require that the heavy tires be carried to and mounted on the machine.

What is needed is an improved tool for breaking the bead from the wheel rim on pneumatic tires, such as are used on trucks, buses, farm machinery, road building equipment, and other large vehicles, which:

a. is portable, wherein it can be brought to the heavy tires and wheels;

b. is safe and simple to use; and c. is economical to manufacture.

SUMMARY OF THE INVENTION

The present invention provides a bead breaking tool for vehicle tires which is designed to satisfy the aforementioned needs. The invention involves a hydraulic jack member whose base is attached to a bead-pressing member and whose extendable head is connected to tension members which, in turn, are connected to the tire wheel.

Accordingly, in the preferred embodiment, the invention comprises a hydraulic jack member, having a base and an extendable head, to which jack base is attached a member which presses on the bead of the tire. The bead-pressing member may involve either of two configurations. One bead-pressing member configuration comprises a presser arm, attached to the jack base and extending horizontally on both sides of the vertically oriented hydraulic jack. Slidingly mounted on the presser arm are adjusting sleeves to which are attached the pressers themselves, the adjusting sleeves permitting radial adjustment for various sizes of wheels. The pressers are arcuate sections generally corresponding to a section of the circumference of the tire bead, so that, with radial adjustment, the presser sections will apply downward pressure on the opposing sides of a tire bead.

The other bead-pressing member configuration also involves a horizontal presser arm attached to the jack base. At the ends of the presser arm are welded supporting ends which are configured to attach to a ring presser member. The ring presser member constitutes a 360 degree pressing member which contacts and presses against the tire bead along its full circumference. Since the bead-pressing radius of a single ring is fixed, a second bead pressing ring of smaller radius has been welded onto the back of the larger radius ring, to permit use, by simple turning over of the ring presser member, with two different sizes of wheels.

Tension members are attached between a head cap, welded to the head of the jack, and the wheel itself. The tension member may involved a chain with a hook attached, the hook fitting within an aperature in the wheel and an appropriate chain link connected to the head cap.

Operation of the hydraulic jack will extend the jack head with relation to the jack base. In the instant case, movement of the jack head away from the wheel is spatially restricted by the tension member connected to the wheel, so that extension of the jack head will lower the jack base, with the bead presser fixedly attached thereto, thus forcing the bead down and breaking it loose from the wheel.

A coil expansion spring may be attached between the head of the jack, as on a head cap, and the base of the jack or its attached presser arm, so as to provide impetus for retracting the jack head back within the jack body upon release of hydraulic pressure.

A chain retractor, either in the form of a rubber sleeve or a coiled spring, attached to chain links, may be used to provide moderate retractive tension within the chain, so as to better hold the chain hooks within the wheel aperatures.

BRIEF DESCRIPTION OF THE DRAWINGS

FIG. 5 illustrates an perspective view of the removable attachment of the presser arm to the ring presser as seen in FIG. 2 and FIG. 4.

FIG. 6 illustrates a partial section at 6—6 of FIG. 3.

FIG. 7 illustrates an perspective view of the removable attachment of the presser arm to the reversed ring presser as seen in FIG. 3 and FIG. 6.

FIG. 8 illustrates a closer view of the head cap.

FIG. 9 illustrates a perspective view of the bead breaker for vehicle tires, wherein the bead pressing is accomplished by an adjustable split presser configuration, with application to a larger wheel oriented with its hub upward.

FIG. 10 illustrates a partial sectional view of the bead breaker of FIG. 9, as applied to a smaller wheel which is oriented with its hub downward.

FIG. 11 illustrates a portion of a chain and hook tension member with a chain retractor in rubber sleeve form.

FIG. 12 illustrates a portion of a chain and hook tension member with an alternative chain retractor in coil spring form.

DESCRIPTION OF THE PREFERRED EMBODIMENT

Figure 1:
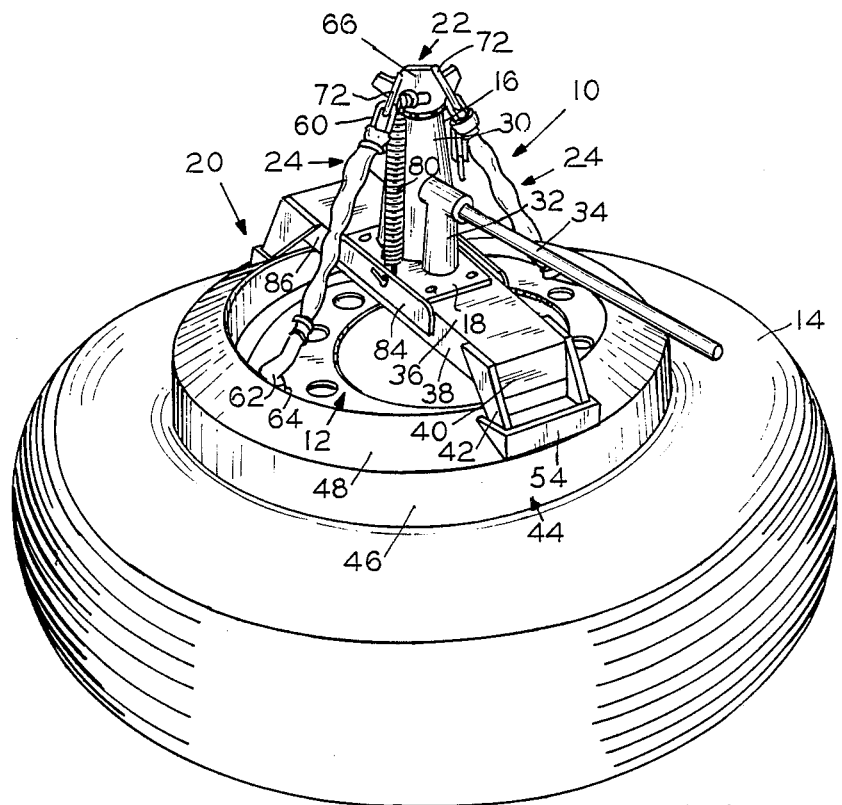
FIG. 1 illustrates a perspective view of the bead breaker for vehicle tires wherein the bead pressing is accomplished by a ring presser configuration.

Referring to the various drawings, there is shown the bead breaker 10 mounted upon a wheel 12 and tire 14.

The bead breaker 10 comprises a hydraulic jack 16 to whose base 18 is attached a bead pressing assembly 20, and to whose extendable head 22 are attached tension members 24 which, in turn, are attached to the wheel 12. The manner of operation is simple and direct. The head 22 of the hydraulic jack 16 is held in a limited position relative to the wheel 12 by the tension members 24, so that operation and expansion of the hydraulic jack 16 will cause the jack base 18 to move towards the wheel 12. The bead pressing assembly 20, being attached to the base 18, thereby presses against the tire 14 along the bead 26 of the tire 14 adjacent to rim 28 of the wheel 12, and breaks the bead 26 loose therefrom. A removable split rim (not shown) may be found, instead of the illustrated rim 28, on various larger wheels; the use of a split rim will not change the application of the instant invention, as will be appreciated by the person skilled in the art. Upon breaking the bead loose from the rim 28 on one side of the wheel 12, the wheel 12 is turned over and the process repeated on the rim 28 on the other side.

Figure 2:
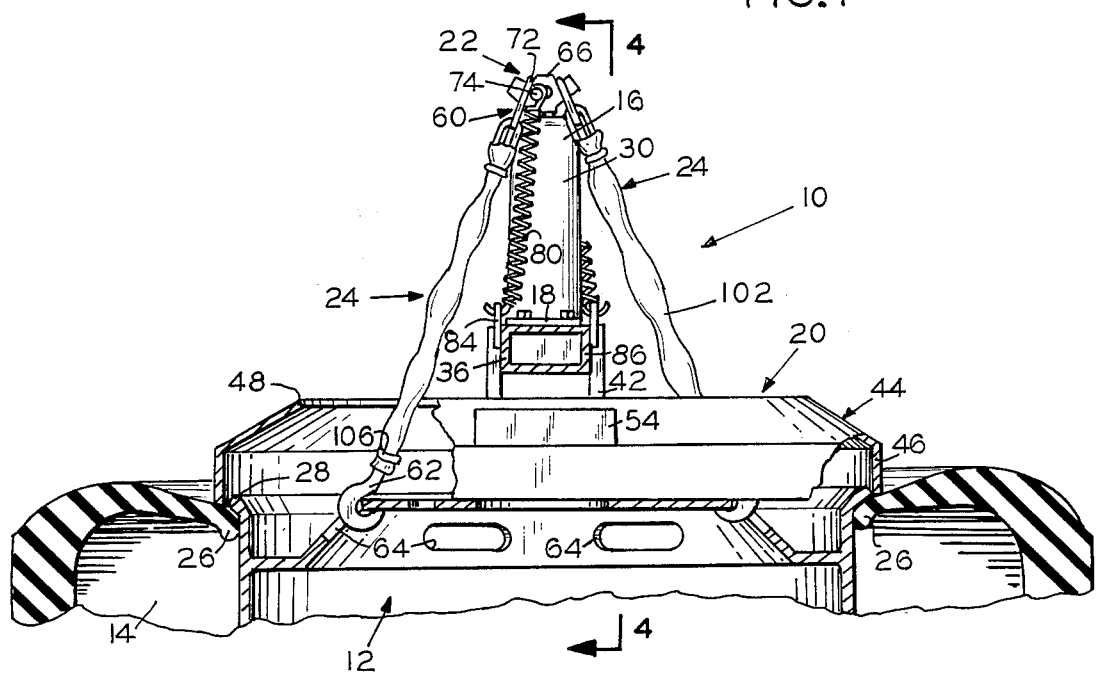
FIG. 2 illustrates a partial sectional view of the bead breaker of FIG. 1, as applied to a larger wheel which is oriented with its hub upward.
Figure 4:
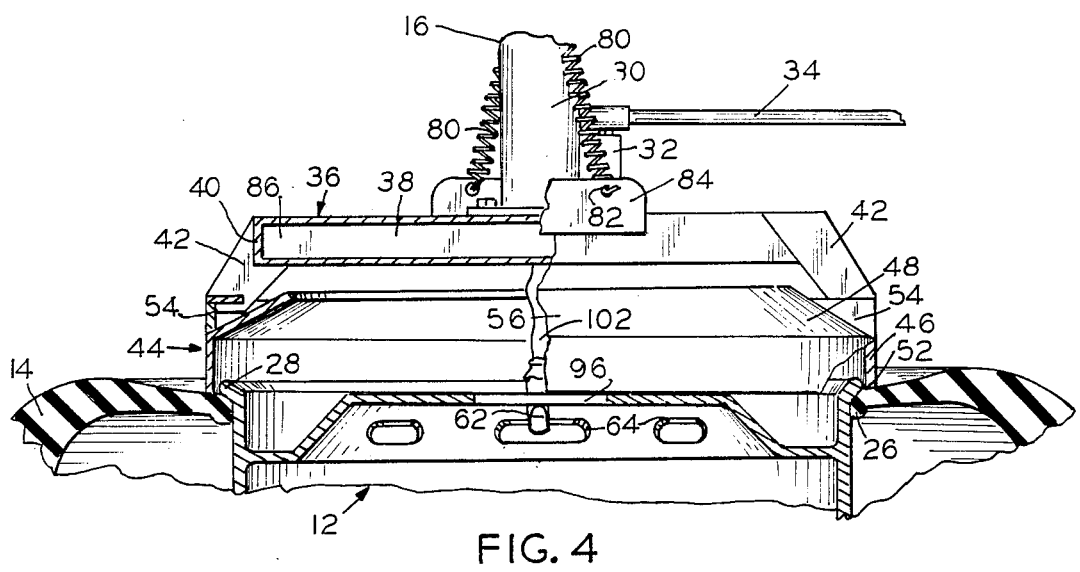
FIG. 4 illustrates a partial section at 4—4 of FIG. 2.

Turning now more particularly to FIGS. 1, 2 and 4, there is shown the preferred configuration of the bead breaker 10. The hydraulic jack 16 is of a type commonly available, the jack body 30 being mounted vertically on base 18 in conjunction with a manual pump 32 and its associated handle 34. While a manually actuated hydraulic jack 16 is shown, and is preferred for its inherent portability, an air- or electric-operated jack would also work, and may be preferred for some applications.

Attached directly to jack base 18 is a bead pressing assembly 20. Two alternative forms of bead pressing assembly 20 are disclosed. In the preferred embodiment, as shown in FIGS. 1, 2 and 4, the bead pressing assembly 20 includes a presser arm 36 which is centrally attached to the jack base 18, the arms 38 themselves extending equally and opposingly on each side of the jack base 18. Attachment of the presser arm 36 to the jack base 18 may be permanent, as by welding, or temporary, as by screws or bolts to permit disassembly for transport or storage. At the ends 40 of the arms 36 are attached, as by welding, supporting end members 42 which are configured to attach to the ring presser member 44.

The ring presser member 44 is circular in shape and is designed to present a pressing ring which contacts the tire 14 along its bead 26 about the full circumference of the rim 28 of the wheel 12. The ring presser member 44 actually is a combination of a larger ring 46 and a smaller ring 48, there thus being provided, in a single ring presser member 44, the capability of bead breaking for two distinct sizes of wheels 12. As seen in the drawings, the larger ring 46 extends straight downward from the presser arm 36, while the smaller ring 48 extends inwards from its attachment to the larger ring 46.

The supporting end members 42 attached to the presser arm 36 are provided with notches 50 at their extremity for attachment upon the ring presser assembly 44. As best seen in FIG. 7, when the smaller ring 48 is utilized, the notches 50 fit snugly upon the pressing rim 52 of the larger ring 46. When the larger ring 46 is operative, the notches 50 fit upon U-shaped supporting end holders 54 which are welded upon the sloping portion 56 of the smaller ring 48, as is best seen in FIG. 5. Thus, as noted previously, the ring presser member 44 is capable of instant adjustment to either of two sizes of wheel 12. The use of a larger ring 46 for a twenty-inch wheel and a smaller ring 48 for a sixteen-inch wheel has worked successfully.

As noted above, the head 22 of the hydraulic jack 16, usually in the form of a piston screw 68, is connected by means of tension members 24, to the wheel 12 itself. In the preferred embodiment, each tension member 24 is comprised of a length of chain 60 to which is attached a hook 62. The chain 60 and hook 62 combination is desirable due to the adjustability in length provided by multiple individual links, although other tension member configurations such as rigid metal bars (not shown) of appropriate length with a hook formed at one end and head 22 attaching means on the other end, also have worked work satisfactorily. In the preferred usage, two chain 60 and hook 62 combinations are applied from opposing sides of the jack head 22 to the wheel 12, the hook 62 attaching into opposing aperatures 64 found as in the standard wheel 12 configuration, and the chain 60 removably attaching at link 72 to a head cap 66 which is attached to the jack head 22, preferably by welding atop the piston screw 68.

The head cap 66 may be formed from a single metal plate 76 as shown in FIG. 8, wherein two wing-hooks 70 extend so as to provide attachment points for the appropriate link of chain 60. In addition, attached, as by welding, to the head cap 66 are two spring hooks 74, which angle outwards from the metal plate 76 and are formed with notches 78 near their outer end. Hooked onto these notches 78, on opposing sides of the head cap 66, are two coil expansion springs 80 which extend downwards to functionally attach to the jack base 18. It has been found convenient to have the coil expansion springs 80 hook into aperatures 82 in side plates 84, which side plates 84 are welded on the opposing sides 86 of the presser arm 36 adjacent to jack base 18. The side plates 84 not only provide a convenient point of attachment for the coil springs 80, but also serve to reinforce the presser arm 36. The purpose of the coils springs 80 is jack retraction, so that, upon release of hydraulic pressure within the jack 16, the extended head 22 of the jack 16 will more readily withdraw into the jack body 30.

Turning now to an alternative configuration for the bead pressing assembly 20, FIG. 9 and FIG. 10 illustrate an adjustable split presser assembly 88. As with the ring presser member 44, the split presser assembly 88 embodies a presser arm 36, with side plates 84, which is attached to and extends outwardly from the base 18 of the hydraulic jack 16. Slidingly mounted on the arms 38 of the presser arm 36 are two adjusting sleeves 90 to which are attached, as by welding, the two pressing members 92 themselves. The pressing members 92 provide arcuate sections 94 which are placed along the bead 26 of the tire 14 adjacent to, and on opposing sides of, the rim 28 of the wheel 12. The shape of the arcuate sections 94 generally corresponds to the circumference of the bead 26 of the tire 12 to which it is applied, so that, with radial adjustment of the adjusting sleeves 90 along the arms 38 of the presser arm 36 so as to locate the arcuate sections 94 along the bead 26, the presser members 92 will apply downward pressure on opposing sides of the tire bead 26. The advantage of the adjustable split presser assembly 88 configuration is that it is continuously adjustable for a number of different size wheels 12 within the length of the arms 38, rather than being limited just to two different sizes of wheels 12 as is a ring presser 44. However, the ring presser 44 configuration has the advantage of applying pressure about the complete circumference of the bead 26; with the split pressure assembly 88, it may be necessary, for an especially stubborn bead 26, to reapply the bead breaker 10 at a location ninety degrees from its original position to complete the separation of the tire 14 from the wheel rim 28.

On the split presser assembly 88 configuration, the side plates 84 may serve an additional function by providing a single inward-limit position for the sliding adjusting sleeves 90, for a certain known size of smaller wheel 12, as is illustrated in FIG. 10.

Figure 3:
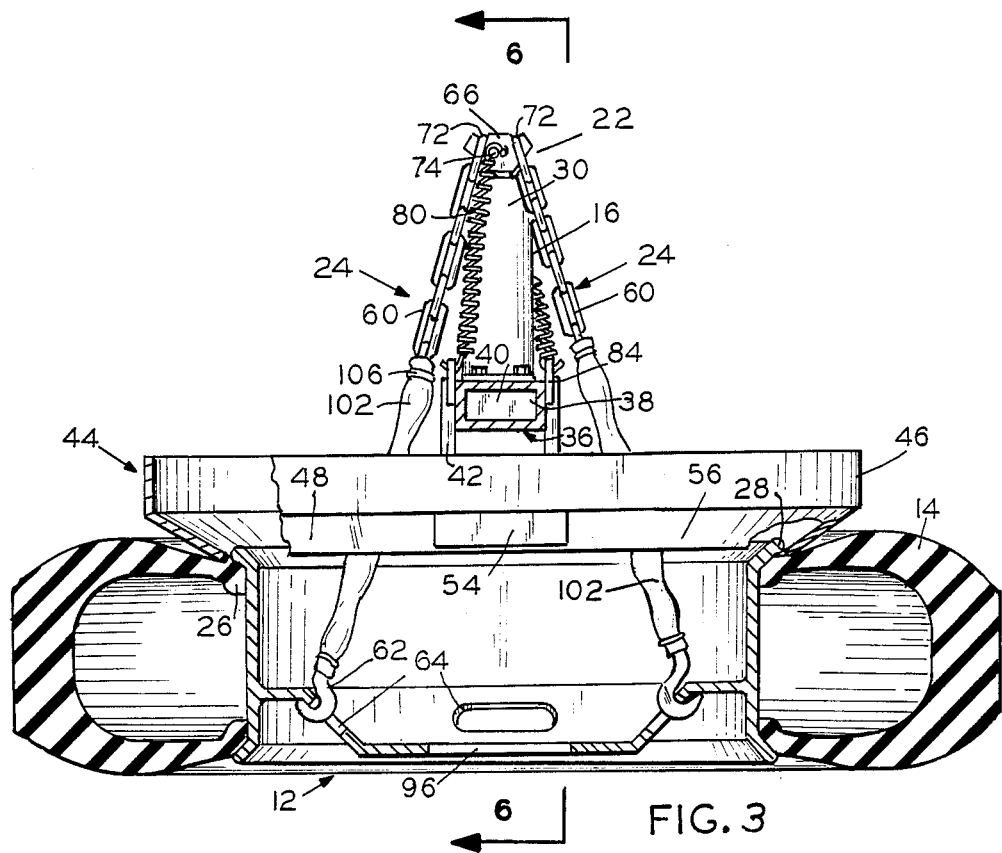
FIG. 3 illustrates a partial sectional view of the bead breaker of FIG. 1, as applied with the ring presser reversed to accomodate a smaller wheel which is oriented with its hub downward.

In FIGS. 1, 2, and 4 for the ring presser 44 configuration and in FIG. 9 for the split presser 88 configuration, the wheel 12 is oriented so as to have its hub 96 and the wheel aperatures 64, through which the hooks 62 connect, in an upward orientation, closer to the jack base 16; while in FIGS. 3 and 6 for the ring presser 44, and in FIG. 10 for the split presser 88, the wheel 12 has been turned over, with the hub 96 and wheel aperatures 64 now downward, further from the jack base 16. It is evident, in comparing the necessary length of the tension members 24, that, when the hub 96 is down, a longer length of chain 60 is required. Thus the advantage of the greater flexibility in using chain 60 with multiple potential hook-up links 72 is apparent. As further seen in FIGS. 3 and 10, for the hub 96 and wheel aperatures 64 in the downward position, the preferred manner of connection of the hooks 62 through the aperatures 64 varies from when the hub 96 and wheel aperatures 64 are in the upward position, primarily due to the probable presence of a surface directly beneath the hub 96. In such case, lower hooking will be accomplished as shown in FIGS. 3 and 10, with the hook pointed radially outward. This manner of connection may result, however, in the chain 60, due to its own weight, swinging inward and pulling the hook 62 loose from its aperature 64. In order to preclude such occurrence, and to simplify the hook 62 connection, it is desirable to have a chain retractor 98 applied to the chain 60, so that a constant tension is placed upon the hook 62 within the aperature 64 to hold it in that position.

FIG. 11 and FIG. 12 illustrate alternative configurations of chain retractor 98 which may be used. FIG. 11 presents the preferred rubber sleeve retractor 100, wherein a rubber sleeve 102 encompasses a number of chain links 104, so as to hold adjacent chain links 104 in a loose, retracted position, due to the resiliency of the rubber along the length of the sleeve 102. The end ties 106 of the sleeve 102 are secured to selected links 104 or possibly between a link 104 and the hook 62 itself, so as to retain the retracted form. FIG. 12 illustrates an alternative coil spring retractor 110, which is located concentrically about the chain 60 and attaches with end hooks 112 to the appropriate chain links 104 to maintain the retraction. Thus, the chain retractor 98 holds a portion of the chain 60 in a somewhat compressed or retracted state, so that moderate manual extension of the chain retractor 98 will allow placement of the hook 62 in the wheel aperature 64 with the retraction pressure from the retractor 98 applying sufficient tension to retain the hook 62 in the aperature 64.

It is thought that the bead breaker for vehicle wheels of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:
1. A bead breaker for vehicle tires, for the breaking loose of a tire bead from a wheel mounting that tire, comprising:
   a. a hydraulic jack member, having a base and an extendable head;
   b. a bead pressing assembly, which comprises:
      a presser arm member, which is attached to said jack base, and which has arms extending outwardly in opposing directions;
      a ring presser assembly, which includes two ring pressers, attached concentrically to each other so as to be reversible, one ring presser being of larger radius and the other ring presser being of smaller radius to permit application to two different sized wheels by reversing the ring presser assembly; each ring presser being of continuous circular shape so as to, when applied, press on the tire bead around the complete circumference of the wheel; and
      means for removable joining of said ring presser assembly to said presser arm member to readily allow the ring presser assembly to be turned over to permit use of either the larger or the smaller ring presser as a bead breaker; and
   c. a plurality of tension members connected at one end to said jack head and an opposite end attachable to said wheel.

2. The bead breaker for vehicle tires, as recited in claim 1, wherein additionally included are spring means attached functionally between said jack base and said extendable jack head to automatically retract the jack head within the jack when the pressure within the jack is released.

3. The bead breaker for vehicle tires, as recited in claim 1, wherein the tension member is a length of chain, having multiple links, with a hook attached at an end thereof, the hook formed to attach through an aperture in said wheel and the chain adjustably attachable at the jack head.

4. The bead breaker for vehicle tires, as recited in claim 3, wherein, in addition, chain retractor means are installed on said length of chain with hook attached, so as to permit a taut placement of the hook in said wheel aperture.

5. The bead breaker for vehicle tires, as recited in claim 4, wherein the chain retractor means comprise a rubber sleeve embracing a plurality of connected links so as to bias the physical position of said links to a retracted position.

6. The bead breaker for vehicle tires, as recited in claim 4, wherein the chain retractor means comprise a coil spring concentrically positioned about a plurality of connected chain links, and attached at its ends to certain of said links so as to bias the physical position of said links to a retracted position.

7. A bead breaker for vehicle tires, for the breaking loose of a tire bead from a wheel mounting that tire, comprising:
   a. a hydraulic jack member, having a base and an extendable head;
   b. a bead pressing assembly, which comprises:
      a presser arm member, which is attached to said jack base, and which has arms extending outwardly in opposing directions;
      a ring presser assembly, which comprises two ring pressers, attached concentrically to each other so as to be reversible, one ring presser being of larger radius and the other ring presser being of smaller radius to permit application to two different sized wheels by reversing the ring presser assembly; each ring presser being of continuous circular shape so as to, when applied, press on the tire bead around the complete circumference of the wheel; and means for removable joining of said ring presser assembly to said presser arm member to readily allow the ring presser assembly to be turned over to permit use of either the larger or the smaller ring presser as a bead breaker;

c. a plurality of tension members connected at one end to said jack head and an opposite end attachable to said wheel, wherein the tension member is a length of chain, having multiple links, with a hook attached at an end thereof, the hook formed to attach through an aperture in said wheel and the chain adjustably attachable at the jack head;

d. spring means, attached functionally between said jack base and said extendable jack head to automatically retract the jack head within the jack when the pressure within the jack is released; and e. chain retractor means installed on said length of chain with hook attached, so as to permit a taut placement of the hook in said wheel aperture.

* * * * *